US007620383B2

United States Patent
Taglienti et al.

(10) Patent No.: US 7,620,383 B2
(45) Date of Patent: Nov. 17, 2009

(54) CLIENT-BASED CONTEXT-BASED BILLING FOR WIRELESS NETWORKS

(75) Inventors: Claudio Taglienti, Barrington Hills, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 848 days.

(21) Appl. No.: 11/025,030

(22) Filed: Dec. 29, 2004

(65) Prior Publication Data
US 2006/0141984 A1    Jun. 29, 2006

(51) Int. Cl.
*H04M 11/00* (2006.01)
(52) U.S. Cl. ............... 455/406; 455/407; 455/405; 455/409
(58) Field of Classification Search .......... 455/406, 455/405, 414.2, 566, 407, 409
See application file for complete search history.

(56) References Cited

U.S. PATENT DOCUMENTS

| | | | |
|---|---|---|---|
| 2002/0129088 A1* | 9/2002 | Zhou et al. | 709/200 |
| 2002/0138601 A1* | 9/2002 | Piponius et al. | 709/223 |
| 2005/0070259 A1* | 3/2005 | Kloba et al. | 455/414.2 |

OTHER PUBLICATIONS

3GPP2 P.20001-B, "3rd Generation Partnership Project 2 '3GPP2' for cdma2000 Wireless IP Network Standard", *3GPP2 and its Organizational Partners*, Sep. 2004, 111 pgs.

* cited by examiner

*Primary Examiner*—Vincent P Harper
*Assistant Examiner*—Khai M Nguyen
(74) *Attorney, Agent, or Firm*—Leydig, Voit & Mayer, Ltd.

(57) ABSTRACT

The invention increases billing options for a wireless service provider by allowing the provider to make billing decisions based upon what a client or mobile station application does both on and off the network. This type of billing, based on context, generates a billing record of events whether or not a particular client accesses the wireless network or not. The invention also provides transmission quality data allowing the wireless network provider to improve user experience in a wireless network. The invention captures the context, including content, quantity, and/or quality of data processed by a mobile station using a client-based application rather than a network-based application. The client-based application causes the mobile station to transmit a billing record corresponding to the captured context to a user monitoring server. The user monitoring server processes the billing record for determining billing and for generating engineering reports.

34 Claims, 4 Drawing Sheets

CLIENT-BASED CONTEXT-BASED BILLING FOR WIRELESS NETWORKS

FIELD OF THE INVENTION

The present invention relates generally to communication systems, and more particularly, to a client-based method of monitoring use of data by, and applications run on, a mobile station for billing and quality of service purposes.

BACKGROUND OF THE INVENTION

Conventional wide area wireless networks using Internet Protocol (IP) employ Content-Based Billing (CBB) to capture the content, including type or kind, of subscriber traffic within the network. To this end, a wireless service provider will deploy CBB probes throughout the wireless network to capture the content of subscriber traffic. At least four problems exist with this approach: the CBB probes are not easy to maintain, they do not scale well, they do not monitor actual user experience, and they only measure subscriber use of the wireless network.

CBB probes are not easy to maintain because they must be deployed at a number of points within a wireless network as shown in FIG. 1. The CBB probes must be included in the access side of the network, such as CBB probe 125, which is located between the packet data serving node (PDSN) 120 and a Local Area Network (LAN)/Wide Area Network (WAN) 130. CBB probe 125 "sniffs" the data sent to and/or requested by the Mobile Station (MS) 100 via the communication tower 105, the base station 110, the Base Station Controller (BSC)/Packet Control Function (PCF) 115, and the PDSN 120. Because the CBB probe 125 operates at the Internet Protocol (IP) level, the CBB probe 125 knows what dynamically allocated IP address sent or requested the sniffed data, but not what subscriber. Remote Authentication Dial In User Service (RADIUS) authorization and accounting data correlates the static Mobile Directory Number (MDN)/Mobile Identification Number (MIN) and Network Access Identifier/(NAI) of the subscriber with the dynamically allocated IP address. As an Authentication, Authorization, and Accounting (AAA) server 135 stores this correlation data, an additional CBB probe 140 is required, especially for billing purposes. When the subscriber uses a Mobile IP-based telephone, the data stream goes through a Home Agent (HA) server 150, leading to yet another CBB probe 155. The results of the sniffing by CBB probes 125, 140, and 155 are then fed to a billing server 145. Over time, changes in the network topology, routing, and security configurations occur. These changes are difficult to support as each can lead to requirements for additional CBB probes and/or different locations for existing CBB probes.

CBB probes do not scale well when a wireless service provider adds new PDSNs and HAs. As each PDSN and HA will require a CBB probe, the number of CBB probes within the overall wireless network can rapidly increase. With a large number of CBB probes in a wireless network, supporting them uniformly becomes difficult. Furthermore, as the CBB probes contain private information (such as information about the subscriber's web browsing and/or use of provider's services), security within the wireless network is a challenge. A wireless service provider needs to accurately and completely probe the various data streams to ensure proper billing of all subscribers. When a wireless network includes an insufficient number of CBB probes, some traffic within the wireless network will not be billed.

Because the CBB probes are IP-based, they do not determine user experience in terms of the Quality of Service (QoS) as the sniffed data does not include data related to QoS metrics. Among the measures of QoS are latency, jitter, and error. Latency is the round-trip delay between a request for data and reception of the requested data at the MS 100. Jitter is the variability in the arrival time of data packets to the MS 100. Errors correspond to the number of retransmissions or dropped packets to the MS 100.

In addition, the CBB probes only measure a subscriber's use of the wireless network. Wireless service providers are developing a growing number of applications that operate on an MS, but do not access the wireless network itself. Examples of such applications are games. At the present time, a wireless service provider includes a flat billing fee for such applications regardless of actual usage as CBB probes cannot detect usage of such applications.

Accordingly, there is a need for a system and method for monitoring data used by, and applications run on, an MS for billing and QoS purposes. Such a system should be easy to implement and maintain, should readily scale with a growing wireless network, and should accurately monitor QoS.

SUMMARY OF THE INVENTION

A first embodiment of the invention is a method for detecting billable event triggers generated by an application on an MS. The billing client, located on the MS itself, generates a billing record based upon these billable event triggers. The billing client subsequently transmits this billing record to a user monitoring server on the wireless network for generating the subscriber's final bill. Because applications that do not access the wireless network can generate billable event triggers, the present invention is more accurately described as context-based billing. Context-based billing contrasts with content-based billing as traditional content-based billing could not determine usage of applications that did not access the wireless network. The present invention, with its context-based billing, detects billable event triggers from all applications, regardless of whether the application accesses the wireless network or not.

A second embodiment of the invention detects billable events through sniffing the transmit and receive data streams in the protocol stack of the MS. The second embodiment allows for monitoring of legacy applications that do not generate billable event triggers. As with the first embodiment, the second embodiment generates a billing record based upon the sniffed billable events and subsequently transmits this billing record to the user monitoring server.

A third embodiment of the invention is a method for detecting transmission quality of the wireless network at the MS and transmitting transmission quality data to the user monitoring server. The user monitoring server on the wireless network subsequently processes this transmission quality data and makes it available for network engineering purposes. In particular, the third embodiment detects transmission quality, including the latency, the jitter, and the errors, during transmit and receive operations. The transmission quality can assist a wireless service provider in determining the wireless network's capability and potential weaknesses. As the location of the MS can be determined, the location of corresponding weaknesses in the wireless network can be determined and remedied more readily.

Corresponding embodiments of the invention are systems for monitoring an MS in terms of billable event triggers, sniffed billable events, and transmission quality. The system can be described at the mobile station level in which the MS monitors itself and transmits corresponding billing record/transmission quality data to the wireless network system. Alternatively, the system can be described at the user monitoring server level in which the user monitoring server receives the billing record/transmission quality data from the MS and makes the data available for billing and network engineering purposes.

Another embodiment is a computer product for operating on one or more computers for monitoring billable event triggers, sniffed billable events, and transmission quality by an MS. The computer product causes the computer(s) to monitor and record billable event triggers, sniffed billable events, and transmission quality by the MS and to transmit corresponding billing record/transmission quality data from the MS to a user monitoring server on a wireless network. The computer product can cause the user monitoring server to make the corresponding billing record/transmission quality data available for further processing, such as for billing and network engineering purposes.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers and in which.

DETAILED DESCRIPTION

Figure 1:
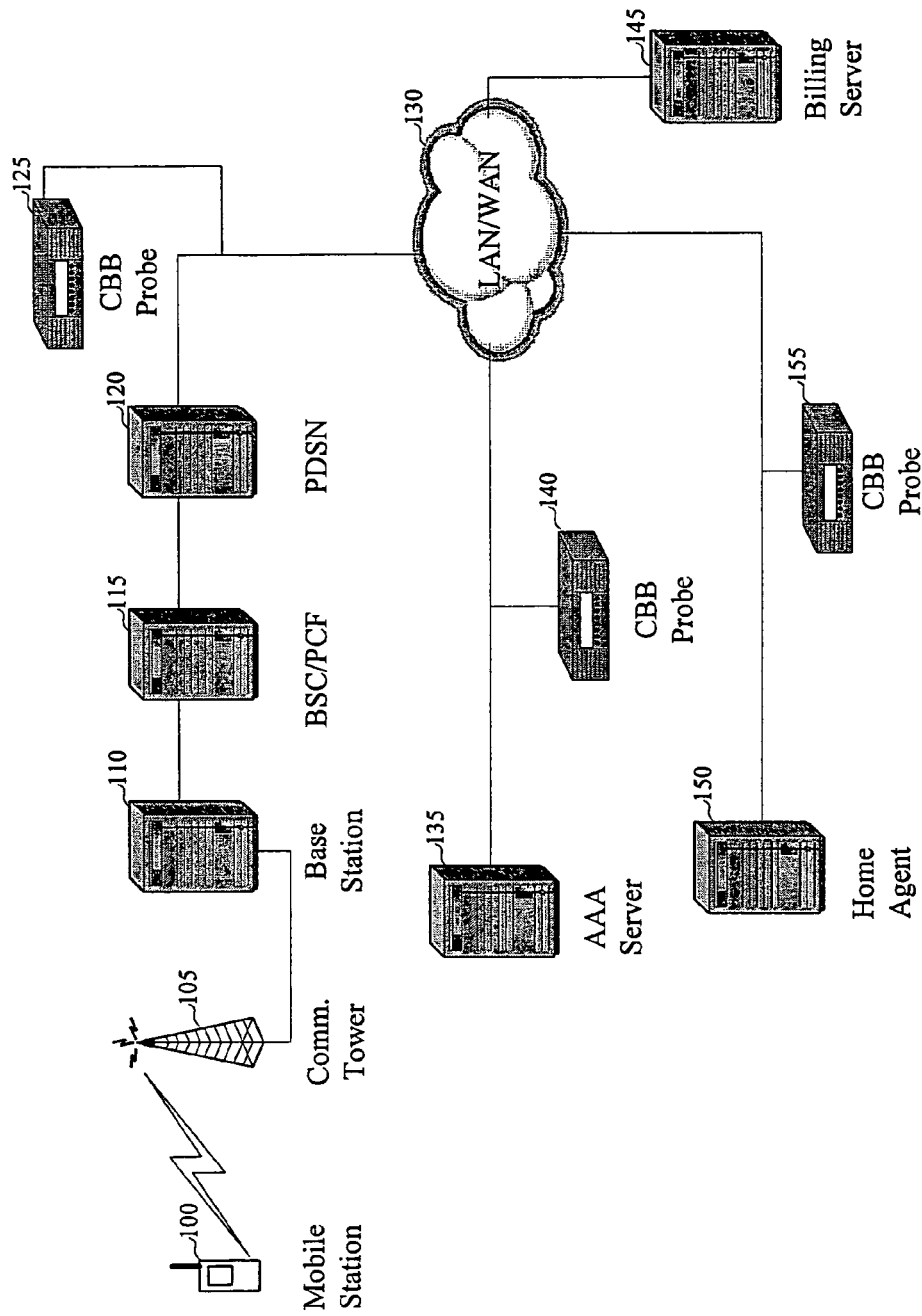
FIG. 1 is a schematic illustration of a cellular network in accordance with the prior art.
Figure 2:
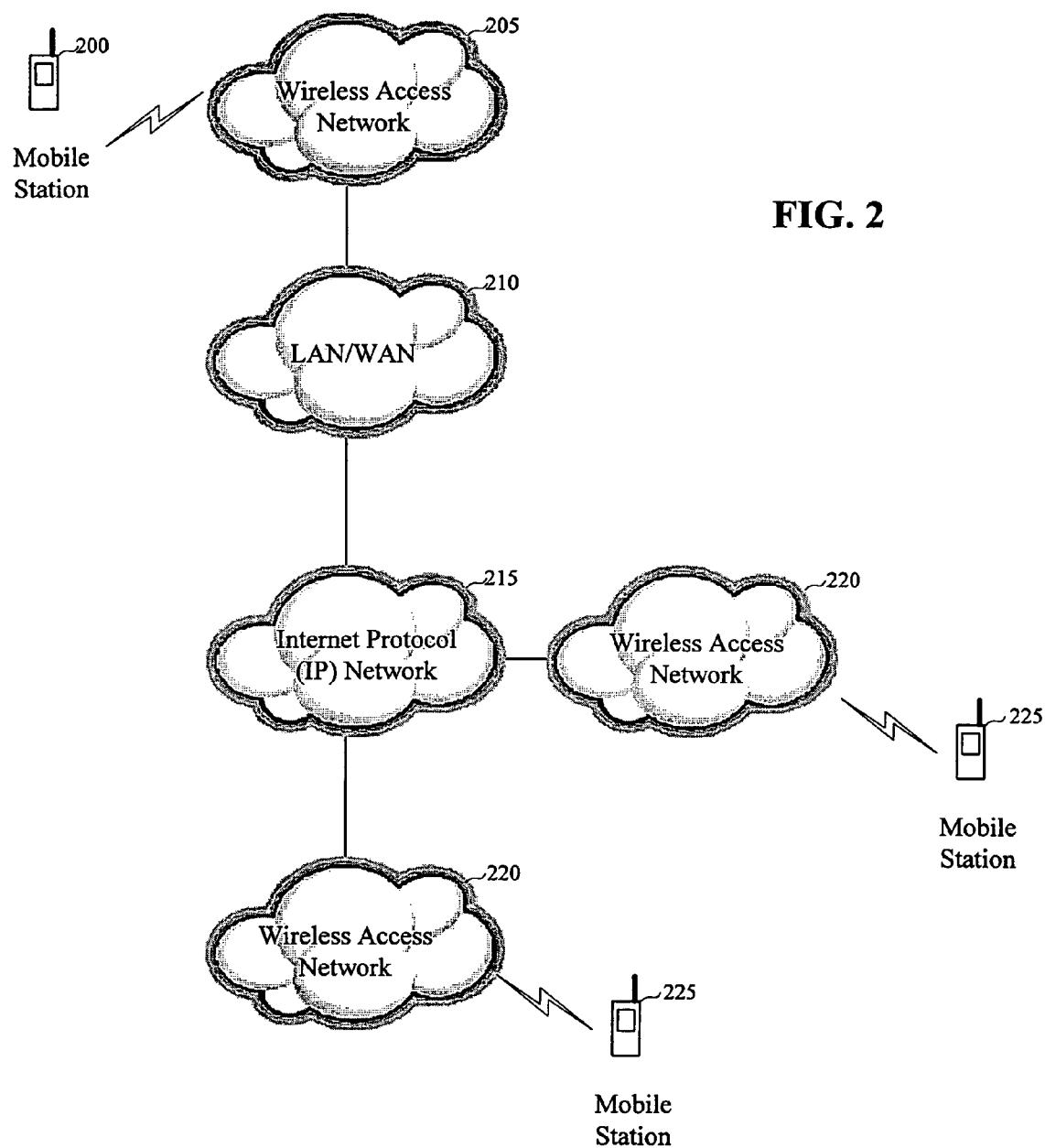
FIG. 2 is a block diagram illustrating a high level cellular network in accordance with the present invention.

FIG. 2 schematically illustrates a representative environment to which the present invention can be applied. The environment includes a Mobile Station (MS) 200 (e.g., a cellular mobile telephone) wirelessly connected to a first wireless access network 205. The first wireless access network 205 connects to a Local Area Network (LAN)/Wide Area Network (WAN) 210. The LAN/WAN 210 connects to an Internet Protocol (IP) network 215, such as the Internet. Other wireless access networks 220 connect to the IP network 215, and provide connection to additional mobile stations 225. The environment allows a wireless network subscriber using an MS 200 to contact another wireless network subscriber using mobile station 225. The environment also allows the wireless network subscriber using an MS 200 to send and receive data from the LAN/WAN 210 or the IP network 215.

Figure 3:
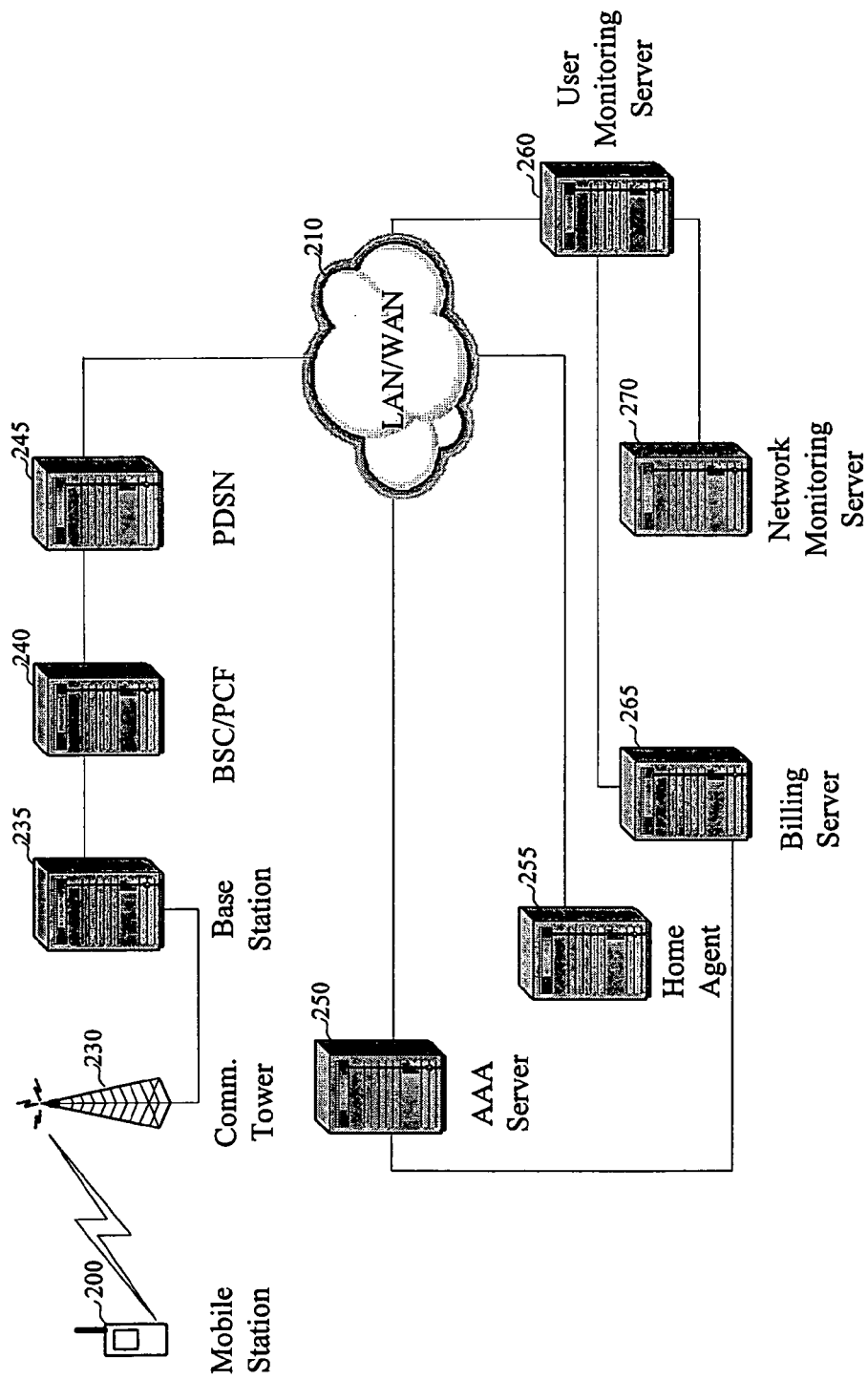
FIG. 3 is a block diagram illustrating in detail a cellular network in accordance with the present invention.

FIG. 3 schematically illustrates in greater detail the representative environment of the present invention. The MS 200 wirelessly connects to a communication tower 230 via a radio frequency (RF) network (e.g., a cdma2000 network), and from there to a base station 235. The base station 235 connects to a base station controller (BSC)/Packet Control Function (PCF) 240. While the illustrated BSC/PCF 240 is a single element, these elements are frequently separate elements within the overall wireless network.

The BSC/PCF 240 connects to a packet data serving node (PDSN) 245. The PDSN 245 connects to the LAN/WAN 210, which connects numerous servers. Among these various servers are an Authentication, Authorizing, and Accounting (AAA) server 250, a Home Agent (HA) server 255, and a User Monitoring Server (UMS) 260. The UMS 260 connects to both a billing server 265 and a Network Monitoring Server (NMS) 270. The billing server 265 also connects to the AAA server 250. Note that while the UMS 260, the NMS 270, and the billing server 265 are illustrated as separate elements, they can be combined into a single server if desired. While the illustrated topology applies to a CDMA-LAN/WAN wireless network, the present invention can also be applied to various other wireless communication networks including, but not limited to, Wi-Fi (IEEE 802.11 standard), Wideband Code Division Multiple Access (WCDMA) networks, General Packet Radio Services (GPRS), and Third Generation (3G) wireless networks.

The relevant data to be passed through the network illustrated in FIGS. 2 and 3 will now be discussed with respect to the first embodiment. The MS 200 contains at least a part of a billing client that detects event triggers generated by an application operating on the MS 200 through the use of Application Programmer Interfaces (APIs). Because the present invention is context-based rather than content-based, both applications that access the wireless network and those that do not can generate event triggers. Many different events can generate an event trigger. The following is a partial list of events that can generate event triggers: initiation/termination of a call, transmission/reception of a text message, transmission of a data request, reception of requested data, and initiation/termination of a client-based application. The above list of events is exemplary only and is not exhaustive.

Furthermore, the present invention allows the same application to operate on mobile stations provided by different wireless service providers and allows each provider to specify which events triggers will be billable events. As a first example, a game application can include different levels of increasing difficulty, with the game generating an event trigger when a player advances to the next level. A first wireless service provider can employ different billing rates for different levels of difficulty, and therefore needs to know when the player reaches the next level. In other words, an event trigger corresponding to the next level is a billable event. A second wireless service provider can employ a flat rate based strictly on elapsed playing time and therefore does not need to know when the player reaches the next level. In this case, when the game generates an event trigger corresponding to the next level, it is not a billable event. As a second example, a first wireless service provider can bill for data received based upon the quantity of data received, while a second wireless service provider can bill based on air time, regardless of the quantity of data received. In this second example, an event trigger based upon receiving data corresponds to a billable event for the first wireless service provider, but not for the second wireless service provider.

Many billable events are time based, and thus the billing client would store the time the event started and ended, along with the application that generated the event trigger(s). The above example game application provided a first example of an event trigger that is not time based, in which the billing client would store the game level. The above example for data reception provided an event trigger in which the billing client would store the quantity of data received (or transmitted). Yet another example is based upon the source of the data. Received voice data can generate an event trigger corresponding to a billing event subsequently billed at a first rate. General data received from a source such as the Internet can generate an event trigger corresponding to a billing event subsequently billed at a second rate. A wireless service provider can offer a third discounted rate for data received for special applications developed by the wireless service provider itself. Such applications could be based upon Java 2 Platform, Micro Edition (J2ME). The wireless service provider can impose a fourth premium rate for billing events corresponding to receiving data from premium Internet services. The premium rate can also be applied to premium location specific services offered by the wireless service provider, such as traffic or weather alerts. Furthermore, general data from the Internet can be billed at the premium data rate when a visited wireless network transmits the data, such as when the MS 200 is operated outside of the home wireless network. Note that an event trigger would not correspond to a billable event for a subscriber with an unlimited premium data source account. If a wireless service provider bills all data at the same rate regardless of source, then the relevant billable record entries would reflect the total quantity of data or air time, not its source.

As the billing client detects the event triggers, the billing client generates a billing record based upon those event triggers corresponding to billable events. For identification purposes, the billing record will include a static identifier unique to the subscriber. This static subscriber identifier can be based on a variety of unique static identifiers, including, but not limited to, MDNs, MINs, NAIs, and SIM codes. Depending upon the implementation of the billing client, the billing client can immediately cause the MS 200 to transmit the billing record to the UMS 260. Alternatively, the billing client can accumulate a number of billable events, five for example, before causing the MS 200 to transmit the billing record to the UMS 260. Accumulating billable events can be advantageous as it conserves network bandwidth compared to transmitting the billing record after each detected billable event. Yet another alternative is to transmit the billing record after a given period of time elapses, for example every five minutes.

Because the billing client can readily include the time a billing event occurs in the billing record, the present invention presents a wireless service provider with another billing option. As bandwidth during peak hours is very valuable, a wireless service provider can encourage use of the MS 200 during off-peak hours by discounting billing events occurring during off-peak hours. A wireless service provider need not apply this discount for applications that do not access the wireless network.

The second embodiment, which can be implemented by itself, or more preferably in conjunction with the first embodiment, monitors the data stream within the protocol stack of the MS 200. The billing client sniffs the data stream to capture the content of the data stream transmitted and received by the MS 200. The billing client preferably captures the content of the data stream at the application level, i.e., content-based usage. One advantage to capturing the content of the data stream at the MS 200 is that the data stream, if sniffed at a high level within the protocol stack, has not been subjected to encryption or compression. In particular, it is preferable to sniff the data stream at the Hypertext Transfer Protocol (HTTP) layer or above. By capturing the content of the data stream without encryption or compression, the captured content will more accurately reflect the content of data actually sent or received by the MS 200. Accurately capturing the content of the data stream is impossible when undertaken by CBB probes within a wireless network passing an encrypted and/or compressed data stream. The reason is that the encryption and/or compression is negotiated and known by a client on the MS 200 at one end of the connection, and by a server at the other end of the connection. While encryption and compression have end-to-end significance, the encrypted/compressed data stream is not intended to be decoded mid-stream, as required by a network-based CBB probe. The sniffing of the data stream is also preferably done before packetization as this simplifies the monitoring process, thereby increasing the accuracy of the capture process.

Once the billing client captures the content of the data stream, it determines the type of the content. The type of content can correspond, for example, to transmission of a text message or receipt of voice data. The billing client then determines whether the type of content corresponds to a billing event. If the wireless service provider charges for transmission of a text message, this type of content corresponds to a billing event. For a wireless service provider that permits unlimited calls, receipt of voice data is a type of content that is not a billable event. As with the first embodiment, when the second embodiment determines the type of content corresponds to a billable event, e.g., transmission of a text message, it generates a billing record based upon the billable event.

An advantage of the billing client is evident when a subscriber roams outside the home or subscribed to wireless network, i.e., to a visited wireless network. The provider of the visited wireless service can force an Internet-bound data stream to or from the roaming subscriber to exit from the visited wireless network's Point of Presence. The Internet-bound data stream should be directed back to the home wireless network so that the appropriate CBB probe can sniff this data stream. Because the visited wireless service provider does not direct the Internet-bound data stream to the appropriate server, the home wireless service provider will be unable to properly bill the roaming subscriber. The billing client of the present invention operates independently of the routing in the wireless access network and will therefore result in accurate billing even if a visited wireless network provides wireless access.

Because the billing client resides on the MS 200 itself, it provides several additional advantages over network-based CBB probes. The invention automatically associates the usage data with a particular subscriber, thereby eliminating the need for correlation with the AAA server 135, and thus CBB probe 140. The invention monitors the data processed by the MS 200 directly, regardless of whether the MS 200 is operating as part of a Simple IP network (thereby eliminating CBB probe 125) or a Mobile IP network (thereby eliminating CBB probe 155). In addition, the invention provides data that cannot be obtained by other means. For example, a network-based CBB probe 125 (or any other network-based element) cannot measure latency from the MS 200 to the PDSN 120 or HA server 150 and back.

In a third embodiment of the invention, which is preferably employed with the first and/or second embodiments, the billing client detects transmission quality of the wireless network. The transmission quality of the wireless network connection can be based upon at least three different metrics and is more accurately a measure of the QoS. The first metric is the latency in the wireless connection. This latency metric corresponds to the round-trip delay time between when the MS 200 requests data and when the MS 200 receives the requested data. The second metric is jitter and corresponds to variation in the arrival time of data packets to the MS 200. The third metric is based upon errors within the wireless network. These errors correspond to the number of dropped data packets and/or the number of retransmissions required.

With the third embodiment, the wireless service provider can enjoy a valuable network diagnostic tool. In particular, if the MS 200 includes Assisted Global Position System (AGPS) capabilities, low QoS measurements can be coordinated with specific physical locations. When the third embodiment stores the physical locations producing low QoS measurements, a wireless service provider can generate network engineering reports based upon location. Poor RF coverage, perhaps due to an insufficient number of base stations, can produce numerous network engineering reports indicating one location is producing low QoS measurements. By upgrading its network based upon the network engineering reports, a wireless service provider can more efficiently provide a uniform QoS to its subscribers regardless of location. When the errors are not localized, it can indicate problems at the network-level rather than the base-station-level, requiring a different set of solutions.

Because the third embodiment detects the transmission quality, this transmission quality can be compared to a subscriber standard for transmission quality based upon the QoS for which the subscriber has paid. The billing client can delete that portion of the billing record coresponding to the billing events for which the transmission quality does not exceed the the subscriber standard. Alternatively, the UMS 260 can delete that portion of the billing record coresponding to the billing events for which the transmission quality does not exceed the the subscriber standard.

In summary, the billing record includes a number of optional data fields: starting and ending times for data transmission and reception, the quantity of data (e.g., 42.7 KB), the source of the data (e.g., wireless subscriber #289 for a cellular telephone call or HomeTownNews.com for a wireless Internet browser application), the latency (e.g., 17 mSec), the jitter (e.g., 3 mSec), errors (e.g., thirteen dropped packets and five retransmission requests), location (e.g., AGPS coordinates), and relevant data for clients not accessing the wireless network. These data fields are preferably associated with each other to provide greater information to the wireless service provider for billing and network engineering purposes. As a first example, a premium data source would be associated with the quantity of data processed from the premium data source. As a second example, a location would be associated with a request for retransmission. As noted above, this list of data fields is for example purposes only and is not exhaustive. A wireless service provider can use additional and/or alternative data for billing or network engineering purposes. As an example, the wireless service provider could monitor transmitted power for possible correlation with error data. Furthermore, while the examples are for billing and network engineering purposes, the present invention is not so limited. The present invention applies to virtually any type of monitoring that can more accurately and/or more easily be done by the MS 200 than with a network-based probe. As an example, an AGPS enabled MS 200 would transmit its AGPS coordinates when a subscriber dials 911. The billing record includes one field that is generally not optional: a static subscriber identifier. The static subscriber identifier can be based on a variety of unique static identifiers, including, but not limited to, MDNs, MINs, NAIs, and SIM codes. The primary time the static subscriber identifier would not be required is when the wireless service provider is generating only network engineering reports, as the identity of the subscriber is not relevant.

The billing client on the MS 200 should meet several requirements. The billing client should be general enough to support all applications present on the MS 200. To this end, the first embodiment applies to applications that generate event triggers, while the second embodiment sniffs the data stream from legacy applications not generating event triggers. The size of the billing client should be small such that it does not require excess memory within the MS 200. In addition, the billing client should not place a significant computational burden on the processor within the MS 200. With the first embodiment, an application generates the event triggers, simplifying the monitoring process. With the second embodiment, the transmit and receive data streams must be monitored leading to a more complex (larger and more computationally intense) billing client compared to the first embodiment. At least two different methods of implementing this billing client are feasible and are preferably used in conjunction with each other. The first method is to embed the billing client within the mobile operating system. The second method uses APIs, as APIs offer the advantage of being usable with various applications running on the MS 200.

After the billing client on the MS 200 generates the billing record, the billing client causes the MS 200 to transmit the billing record to the wireless network. The MS 200 can transmit this billing record immediately or accumulate a number of billable events and transmit them simultaneously as disclosed above. To ensure transmission of the billing record to the wireless network, the billing record is stored in nonvolatile memory within the MS 200 before transmission. The wireless network passes the billing record from the base station 235 to the BSC/PCF 240 to the PDSN 245, through the LAN/WAN 210 and finally to the UMS 260. The UMS 260, upon receipt of the billing record, can process it for at least two purposes. The first purpose is to forward the relevant data to the billing server 265 for the wireless service provider to determine a subscriber's bill. The billing record gives the wireless service provider various billing options based upon numerous factors. The billing data also provides verification that the wireless service provider provided the level of QoS purchased by the subscriber.

Because the billing client stores the billing record in the mobile station 200 itself, the billing client can calculate billing information based upon the billing record. The billing client can then cause the MS 200 to display real time data usage and/or billing information directly to the subscriber. The ability to display real time data usage and/or billing information would be especially beneficial for businesses that pass along wireless expenses to business clients. Furthermore, by storing application usage data, any charges due to running an application supplied by a business client can readily be separated from other charges.

The UMS 260 can also process the billing record and forward the relevant transmission quality data to the NMS 270. As noted above, the wireless service provider can use this information to generate network engineering reports that indicate weaknesses within the wireless network. These engineering reports are especially helpful when they contain location data, as would be the case if the MS 200 includes AGPS capabilities.

As the wireless service provider bills a subscriber based upon the billing record, the subscriber may attempt to compromise the billing client. To this end, the MS 200 always transmits the quantity of data transmitted and received at the bearer level in order to operate correctly. This quantity of data at the bearer level is equivalent to the Point-to-Point Protocol (PPP) payload used in CDMA wireless networks and reported in the AAA Radius accounting records available from the AAA server 250. This same quantity of data can be part of the billing record such that discrepancies in the quantities are an indication to the wireless service provider of a compromised billing client. This method detects a compromised billing client when the billing record from the billing client is different than the PPP payload data received by the billing server 265 from the AAA server 250.

Figure 4:
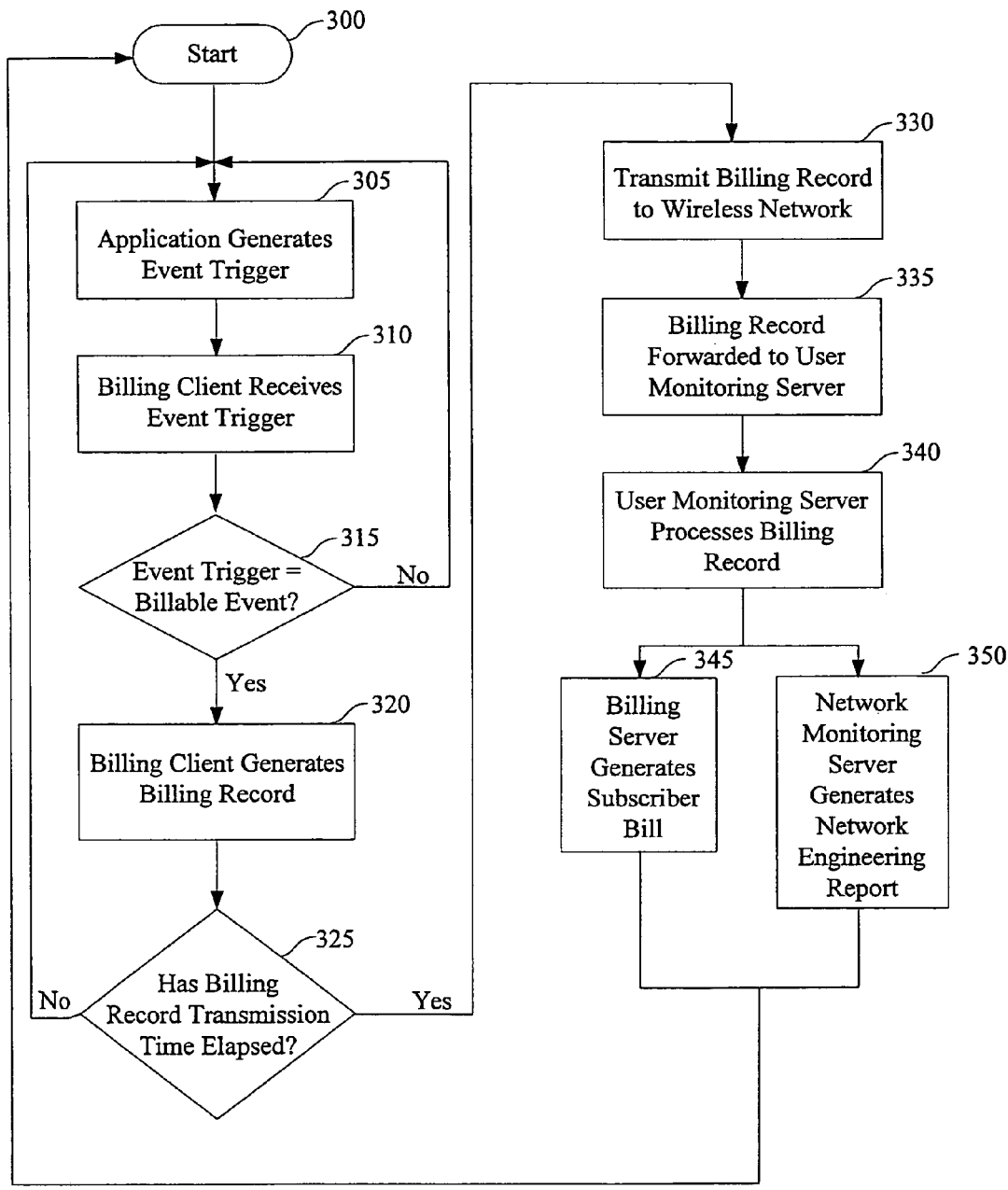
FIG. 4 is a flow diagram illustrating a billing client method for monitoring the content of data processed by a mobile station in accordance with a first embodiment of the present invention.

FIG. 4 illustrates a flow diagram of a process for monitoring billable events within the MS 200 in accordance with the first embodiment of the present invention. The process monitors the billable events within the MS 200 via a billing client, at least a portion of which is running on the MS 200 itself. The MS 200 transmits the resultant billing record to a UMS 260 on the wireless network. The UMS 260 processes the billing data and makes it available to the billing server 265 and the NMS 270 for additional processing.

The process starts at step 300. In step 305, an application running on the MS 200 generates an event trigger. In step 310, the billing client receives the event trigger. In step 315, the billing client determines if the event trigger corresponds to a billable event. If the event trigger does not correspond to a billable event, the billing client returns to step 305 and awaits the next event trigger. If the event trigger does correspond to a billable event, in step 320, the billing client generates a billing record based upon the billable event. Examples of relevant data included in the billing record can include, but are not limited to, the name of the application, the time of the billable event, a quantity of data transmitted, and a retransmission request. The billing record will further include the static subscriber identifier.

The billing client, in step 325, determines if the billing record transmission time has elapsed. If the billing record transmission time has not elapsed, the billing client repeats steps 305 through 325. If the billing record transmission time has elapsed, in step 330, the billing client causes the MS 200 to transmit the billing record to the wireless network. In step 335, the wireless network forwards the billing record to the UMS 270. The UMS 270, in step 340, processes the billing record and forwards the relevant portions of the billing record to the billing server 265 and the NMS 270. The billing server generates a subscriber bill based, in part, upon the relevant portions of the billing record in step 345. The NMS generates a network engineering report based, in part, upon the relevant portions of the billing record in step 350. The process repeats as long as the MS 200 is powered-up.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A method for generating context-based billing information for a mobile station, the method comprising:
   receiving, from an application running on the mobile station, an event trigger;
   determining if the event trigger corresponds to a billable event;
   generating a billing record based upon the event trigger when it is determined the event trigger corresponds to a billable event, the billing record further including a static subscriber identifier; and
   transmitting the billing record from the mobile station to a user monitoring server.

2. A method in accordance with claim 1, further comprising:
   determining whether the billing record should be transmitted immediately,
   wherein generating the billing record includes accumulating data based upon one or more billable events into a single billing record when it is determined that the billing record should not be transmitted immediately.

3. A method in accordance with claim 1, further comprising:
   capturing a content of a data stream transmitted from or received by the mobile station;
   determining a type of content of the data stream;
   determining if the type of content corresponds to a billable event, wherein generating the billing record includes adding type data to the billing record when it is determined that the type of content corresponds to a billable event.

4. A method in accordance with claim 1, wherein a billable event is selected from the group consisting of transmitting voice data, receiving voice data, receiving data from the Internet, receiving data from a wireless service provider, initiation of a call, termination of a call, initiation of an application that does not access a wireless network, termination of an application that does not access a wireless network, and a change hi level of an application that does not access a wireless network.

5. A method in accordance with claim 1, wherein generating the billing record includes adding a time at which a billable event occurred to the billing record.

6. A method in accordance with claim 1, further comprising: calculating billing information based upon the billing, record; and displaying, on the mobile station, the billing information.

7. A method in accordance with claim 1, further comprising:
   detecting transmission quality of a data stream transmitted from or received by the mobile station,
   wherein generating the billing record includes adding the detected transmission quality of the data stream to the billing record.

8. A method in accordance with claim 7, wherein the transmission quality of the data stream is one or more metrics selected from the group consisting of transmission latency, transmission jitter, and transmission errors.

9. A method in accordance with claim 7, further comprising: determining if the detected transmission quality exceeds a subscriber standard; and determining if a billing event corresponds to the detected transmission quality, wherein generating the billing record includes deleting a portion of a billing record corresponding to a billing event when it is determined the detected transmission quality does not exceed the subscriber standard for the billing event.

10. A method in accordance with claim 7, further comprising:
   detecting a location of the mobile station,
   wherein generating the billing record includes adding the detected location of the mobile station to the billing record.

11. A method for generating a context-based bill for a mobile station subscriber, the method comprising:
   receiving, from a billing client running on a mobile station, a billing record, the billing record based upon a billable event, the billing record including a static subscriber identifier;
   accumulating one or more billing records for a billing period;
   determining if the billing period has elapsed; and
   generating, for the mobile station subscriber corresponding to the static subscriber identifier, the context-based bill based upon the accumulated one or more billing records when it is determined that the billing period has elapsed.

12. A method in accordance with claim 11, further comprising:
receiving, from an authorization server, data corresponding to a quantity of data transmitted and received by the mobile station;
comparing the data received from the authorization server with a portion of the billing record corresponding to a quantity of data transmitted and received by the mobile station; and
determining the billing client has been compromised when the data received from the authorization server does not correspond to the portion of the billing record corresponding to a quantity of data transmitted and received by the mobile station.

13. A method in accordance with claim 11, further comprising: determining a time at which a billable event occurred from the billing record; wherein generating the context-based bill includes billing the billable event at a first rate when the billable event is determined to have occurred during a first time period and billing the billable event at a second rate when the billable event is determine to have occurred during a second time period, the second time period different from the first time period.

14. A method in accordance with claim 11, further comprising: determining if a billing record includes detected transmission quality; and generating a network engineering report when it is determined that the billing record includes detected transmission quality.

15. A method in accordance with claim 14, wherein the detected transmission quality is one or more metrics selected from the group consisting of transmission latency, transmission jitter, and transmission errors.

16. A method in accordance with claim 14, further comprising:
determining if the detected transmission quality exceeds a subscriber standard; determining if a billing event corresponds to the detected transmission quality, wherein generating the context-based bill includes deleting a portion of a context-based bill corresponding to a billing event when it is determined the detected transmission quality does not exceed the subscriber standard for the billing event.

17. A method in accordance with claim 14, further comprising: determining if a billing record includes a location of the mobile station, wherein generating the network engineering report includes adding the location of the mobile station to the network engineering report.

18. A mobile station for generating context-based billing information, the mobile station comprising:
a transmitter for transmitting a billing record;
a memory for storing computer executable code; and
a processor for processing the computer executable code stored in the memory, the computer executable code including:
computer executable code for receiving, from an application running on the mobile station, an event trigger;
computer executable code for determining if the event trigger corresponds to a billable event;
computer executable code for generating the billing record based upon the event trigger when it is determined the event trigger corresponds to a billable event;
computer executable code for adding to the billing record a static subscriber identifier; and
computer executable code for causing the transmitter to transmit the billing record from the mobile station to a user monitoring server.

19. A mobile station in accordance with claim 18, wherein the computer executable code further includes:
computer executable code for determining whether the billing record should be transmitted immediately,
wherein the computer executable code for generating the billing record includes computer executable code for accumulating data based upon one or more billable events into a single billing record when it is determined that the billing record should not be transmitted immediately.

20. A mobile station in accordance with claim 18, wherein the computer executable code further includes:
computer executable code for capturing a content of a data stream transmitted from or received by the mobile station;
computer executable code for determining a type of content of the data stream;
computer executable code for determining if the type of content corresponds to a billable event,
wherein the computer executable code for generating the billing record includes computer executable code for adding type data to the billing record when it is determined that the type of content corresponds to a billable event.

21. A mobile station in accordance with claim 18, wherein a billable event is selected from the group consisting of transmitting voice data, receiving voice data, receiving data from the Internet, receiving data from a wireless service provider, initiation of a call, termination of a call, initiation of an application that does not access a wireless network, termination of an application that does not access a wireless network, and a change in level of an application that does not access a wireless network.

22. A mobile station in accordance with claim 18, wherein the computer executable code for generating the billing record includes computer executable code for adding a time at which a billable event occurred to the billing record.

23. A mobile station in accordance with claim 18, wherein the computer executable code further includes:
computer executable code for calculating billing information based upon the billing record; and
computer executable code for displaying, on the mobile station, the billing information.

24. A mobile station in accordance with claim 18, wherein the computer executable code further includes:
computer executable code for detecting transmission quality of a data stream transmitted from or received by the mobile station,
wherein the computer executable code for generating the billing record includes computer executable code for adding the detected transmission quality of the data stream to the billing record.

25. A mobile station in accordance with claim 24, wherein the transmission quality of the data stream is one or more metrics selected from the group consisting of transmission latency, transmission jitter, and transmission errors.

26. A mobile station in accordance with claim 24, wherein the computer executable code further includes:
computer executable code for determining if the detected transmission quality exceeds a subscriber standard; and
computer executable code for determining if a billing event corresponds to the detected transmission quality,
wherein the computer executable code for generating the billing record includes computer executable code for deleting a portion of a billing record corresponding to a billing event when it is determined the detected transmission quality does not exceed the subscriber standard for the billing event.

27. A mobile station in accordance with claim 24, further comprising: location detecting apparatus for detecting a location of the mobile station; wherein the computer executable code further include:
   computer executable code for receiving, from the location detecting apparatus, the detected location of the mobile station, and
   wherein the computer executable code for generating the billing record includes computer executable code for adding the detected location of the mobile station to the billing record.

28. A user monitoring server for generating a context-based bill for a mobile station subscriber, the user monitoring server comprising:
   a receiver for receiving a billing record;
   a memory for storing computer executable code; and
   a processor for processing the computer executable code stored in the memory, the computer executable code including:
   computer executable code for receiving, from the receiver, a billing-record from a billing client running on a mobile station, the billing record based upon a billable event, the billing record including a static subscriber identifier;
   computer executable code for accumulating one or more billing records for a billing period;
   computer executable code for determining if the billing period has elapsed;
   computer executable code for generating, for the mobile station subscriber corresponding to the static subscriber identifier, the context-based bill based upon the accumulated one or more billing records when it is determined that the billing period has elapsed.

29. A user monitoring server in accordance with claim 28, wherein the computer executable code further includes:
   computer executable code for receiving, from the receiver, data from an authorization server, the data corresponding to a quantity of data transmitted and received by the mobile station;
   computer executable code for comparing the data from the authorization server with a portion of the billing record corresponding to a quantity of data transmitted and received by the mobile station; and
   computer executable code for determining the billing client has been compromised when the data received from the authorization server does not correspond to the portion of the billing record corresponding to a quantity of data transmitted and received by the mobile station.

30. A user monitoring server in accordance with claim 28, wherein the computer executable code further includes:
   computer executable code for determining a time at which a billable event occurred from the billing record;
   wherein the computer executable code for generating the context-based bill includes computer executable code for billing the billable event at a first rate when the billable event is determined to have occurred during a first time period and computer executable code for billing the billable event at a second rate when the billable event is determine to have occurred during a second time period, the second time period different from the first tune period.

31. A user monitoring server in accordance with claim 28, wherein the computer executable code further includes:
   computer executable code for determining if a billing record includes detected transmission quality; and
   computer executable code for generating a network engineering report when it is determined that the billing record includes detected transmission quality.

32. A user monitoring server in accordance with claim 31, wherein the detected transmission quality is one or more metrics selected from the group consisting of transmission latency, transmission jitter, and transmission errors.

33. A user monitoring server in accordance with claim 31, wherein the computer executable code further includes:
   computer executable code for determining if the detected transmission quality exceeds a subscriber standard;
   computer executable code for determining if a billing event corresponds to the detected transmission quality,
   wherein the computer executable code for generating the context-based bill includes computer executable code for deleting a portion of a context-based bill corresponding to a billing event when it is determined the detected transmission quality does not exceed the subscriber standard for the billing event.

34. A user monitoring server in accordance with claim 31, wherein the computer executable code further includes:
   computer executable code for determining if a billing record includes a location of the mobile station,
   wherein the computer executable code for generating the network engineering report includes computer executable code for adding the location of the mobile station to the network engineering report.

* * * * *

UNITED STATES PATENT AND TRADEMARK OFFICE
CERTIFICATE OF CORRECTION

PATENT NO. : 7,620,383 B2 Page 1 of 1
APPLICATION NO. : 11/025030
DATED : November 17, 2009
INVENTOR(S) : Taglienti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1261 days.

Signed and Sealed this

Twenty-sixth Day of October, 2010

David J. Kappos
*Director of the United States Patent and Trademark Office*